Figure 1:
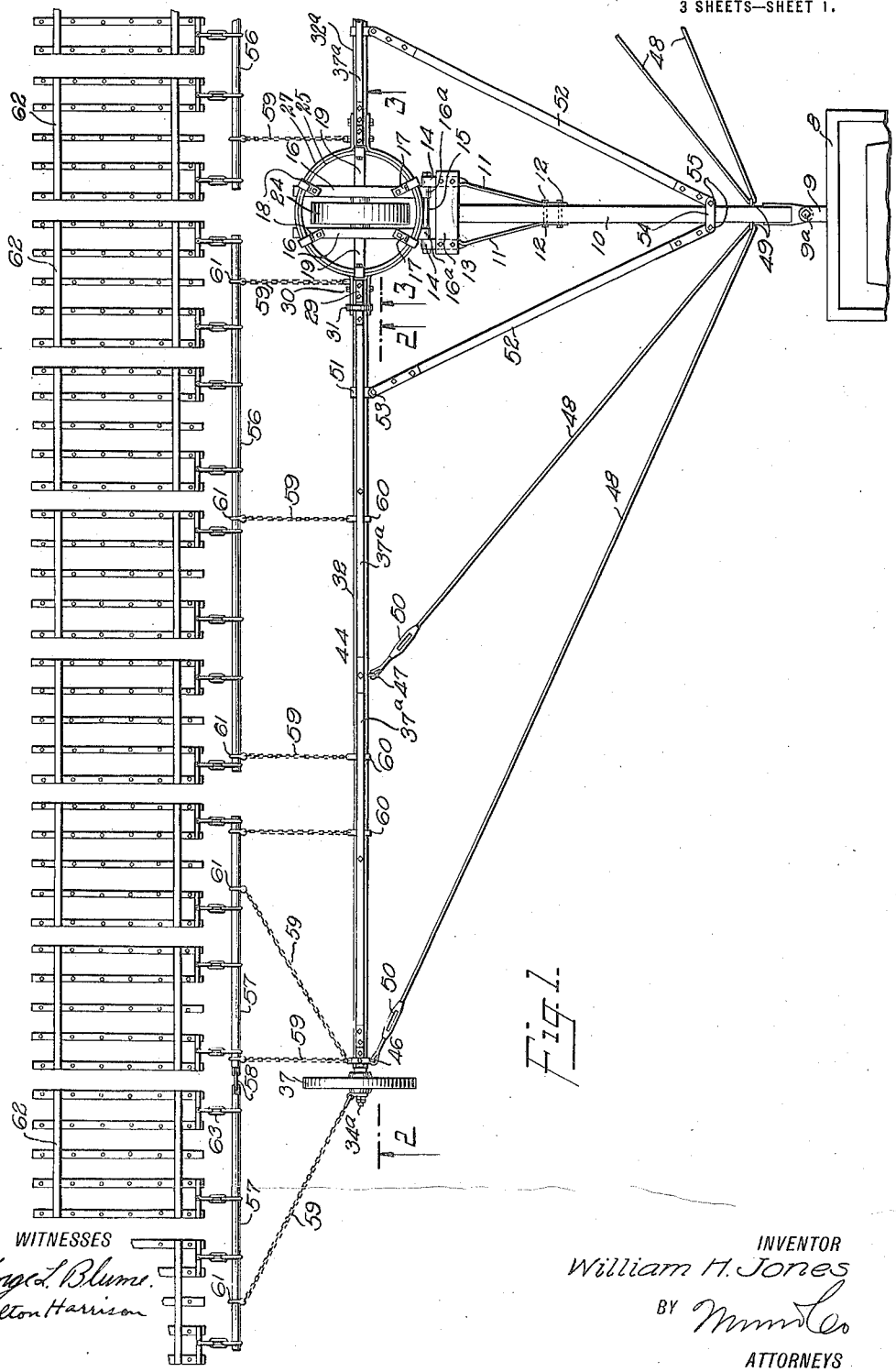

W. H. JONES.
HARROW EVENER.
APPLICATION FILED JULY 24, 1915.

1,212,957.

Patented Jan. 16, 1917.
3 SHEETS—SHEET 1.

WITNESSES
George L. Blume
Walton Harrison

INVENTOR
William H. Jones
BY
ATTORNEYS

W. H. JONES.
HARROW EVENER.
APPLICATION FILED JULY 24, 1915.
1,212,957.
Patented Jan. 16, 1917.
3 SHEETS—SHEET 2.
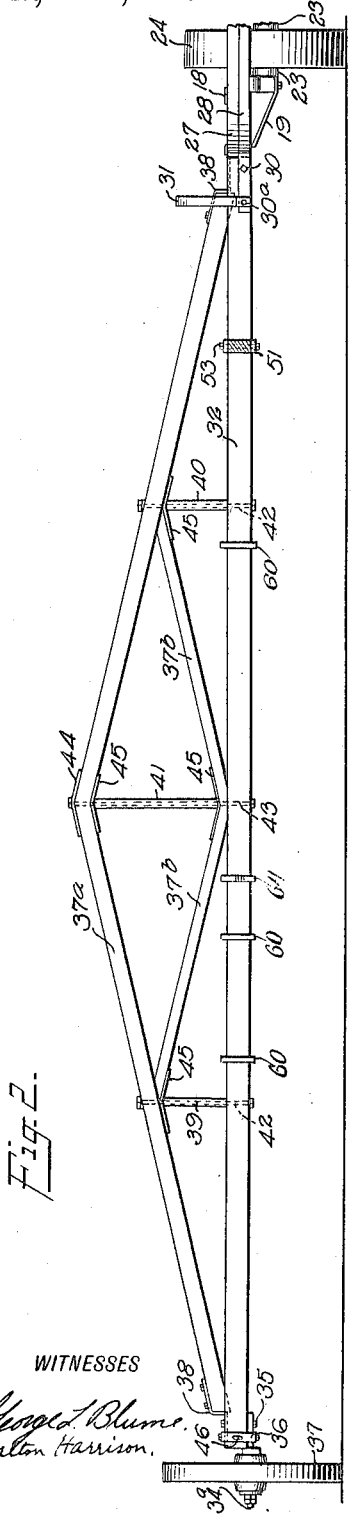
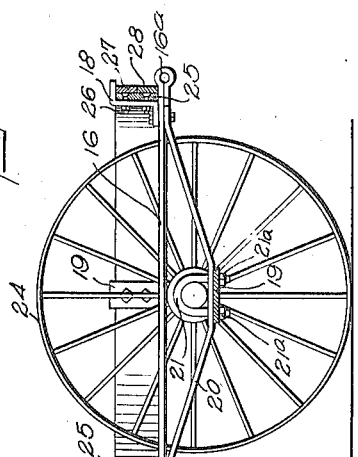
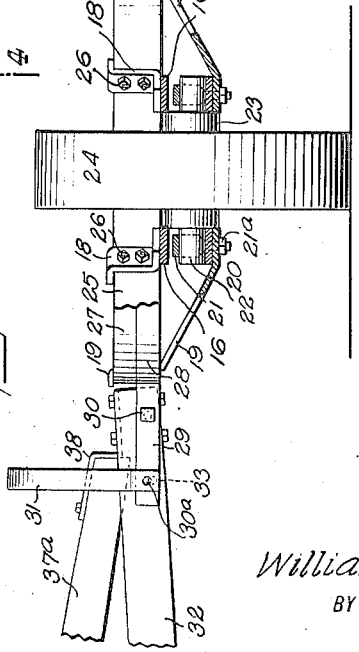
WITNESSES
Gerald L. Blume
Walton Harrison
INVENTOR
William H. Jones
BY
ATTORNEYS

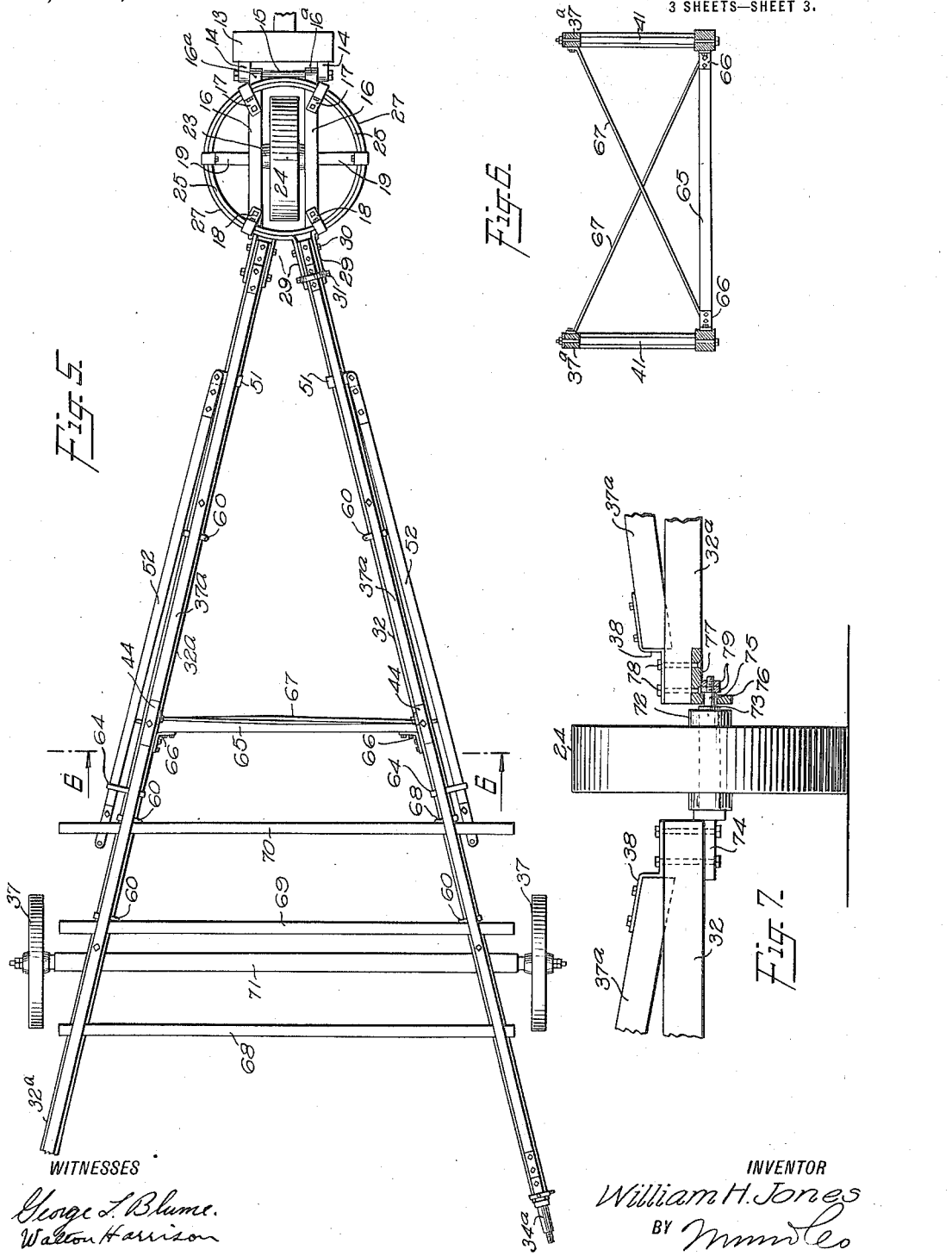

UNITED STATES PATENT OFFICE.

WILLIAM H. JONES, OF NELSON, CALIFORNIA.

HARROW-EVENER.

1,212,957.    Specification of Letters Patent.    Patented Jan. 16, 1917.

Application filed July 24, 1915. Serial No. 41,746.

*To all whom it may concern:*

Be it known that I, WILLIAM H. JONES, a citizen of the United States, and a resident of Nelson, county of Butte, State of California, have invented a new and Improved Harrow-Evener, of which the following is a full, clear, and exact description.

My invention relates to harrow eveners—that is, to devices more or less in the nature of harrows, and consisting of a large number of separate harrow sections, and means for holding the same together in assembled relation, so that they may be readily drawn along the ground by a tractor or the like.

More particularly stated, my invention contemplates a harrow evener of a large size, and adapted to make a swath of considerable width, say eighty or a hundred feet—the parts being so arranged that they may be taken apart to some extent and reassembled, so that the device may be readily transported after the manner of a vehicle, from one point to another.

My invention further comprehends various improvements in harrow eveners, for increasing the efficiency of the same.

Reference is made to the accompanying drawings forming a part of this specification, and in which like letters indicate like parts.

Figure 1 is a fragmentary plan of my improved harrow evener; Fig. 2 is a section on the line 2—2 of Fig. 1 looking in the direction of the arrows; Fig. 3 is a section on the line 3—3 of Fig. 1 looking in the direction of the arrows; Fig. 4 is a section on the line 4—4 of Fig. 3 looking in the direction of the arrows and showing the centrally disposed carrying wheel; Fig. 5 is a plan view of the mechanism, as assembled, for the purposes of transporting the device after the manner of a vehicle; Fig. 6 is a section on the line 6—6 of Fig. 5 looking in the direction of the arrows; Fig. 7 is a section similar to Fig. 3, but showing another form of my device.

A tractor is shown at 8 and may be driven by gasolene, oil, electricity or steam, as desired. It carries a draw-bar 9, the latter being connected by a coupling pin 9$^a$, with a tongue 10. Mounted upon opposite sides of this tongue is a pair of hounds 11 secured thereto by bolts 12. Mounted rigidly upon these is a cross-plate 13. The hounds are provided with bearings 14, and extending through these bearings is a pin 15. A pair of supporting bars 16 is provided with eyes 16$^a$ (see Fig. 4) the bolt 15 extending through these eyes and forming a pivotal connection between the supporting bars 16 and the hounds 11. The tongue 10 is thus movable relatively to the bars 16, in a vertical plane. Mounted rigidly upon the supporting bars 16 are braces 17, 18, which extend radially from a common center. Two other braces 19 are supported by an arch bar 20 (see Figs. 3 and 4) upon which they are firmly secured by bearings 21 of U-form, which are held in position by nuts 21$^a$. Extending through the bearings 21 is a stub shaft 22, which extends through a hub 23, carrying a wheel 24. The wheel 24 is built quite strong and is disposed centrally of the entire apparatus. It is one of the carrying wheels. Secured rigidly to the outer ends of the several braces 17, 18, 19, is an annular member 25 of metal which for convenience I designate as a circle. It is secured directly to the braces 17, 18, 19, 20, by bolts 26, and hence is fixed relatively to the position of the supporting bars 16 and the vertical plane of the carrying wheel 24. Concentric to the circle 25 and fitting the same externally are two other circles 27, 28, each having a vertical width equal to one-half the vertical width of the circle 25. The circles 27, 28, may be regarded as bearings, and they are movable relatively to each other and to the circle 25. The circle 28 is provided with a pair of flat extending portions 29 disposed parallel with each other, and extending through these portions is a pivot pin 30. A brace 31 having the general form of a yoke is mounted upon the extending portions 29 and is provided with a bolt hole 30$^a$. Located upon opposite sides of the carrying wheel 24, and extending some distance in opposite directions, are a pair of draft beams 32, 32$^a$, of considerable size and strength. The draft beam 32 is connected with the extending portion 29 of the circle 28. As the two draft beams 32 and 32$^a$ are exactly alike, except as to their connections adjacent the carrying wheel 24, I will describe only one of them. A gudgeon 34$^a$ is secured upon the outer end of the draft beam by aid of a bolt 35 and a cuff 36, as may be understood from Fig. 2. A carrying wheel 37 is mounted upon this gudgeon, and like the carrying wheel 24, rests upon the ground. The draft beam 32 is provided with a bridge truss 37$^a$ shown more particularly in Fig. 2. At the ends of the bridge truss 37ª are end strips 38. A number of stays 39, 40, 41, of tubular form are provided, and disposed as indicated in Fig. 2. Extending through these tubular stays are rod stays 42, 43. Tie plates 44, 45, are used for enabling the stays to obtain better bearing upon the parts they engage. Braces 37ᵇ, serving the purpose of struts, still further increase the strength of the draft beam 32. The draft beam 32 is provided with eyes 46, 47, and connected with these eyes is a cable 48 serving as a brace and extending through an eye 49 carried by the tongue 10. The cable brace is provided with turnbuckles 50, whereby it may be tightened.

The draft beam 32 carries a collar 51, and a brace rod 52 is connected with this collar by a pin 53. This brace rod is also connected with a collar 54 by a pin 55, the collar 54 being secured to the tongue 10.

A number of trees are shown at 56, 57, each tree 56 being of substantially double the length of one of the trees 57. The trees 57 are arranged in pairs, as indicated at the left of Fig. 1, the trees of each of these pairs being connected together by a coupling 58. A number of chains 59 are connected with collars 60, carried by the draft beam 32 and extending forwardly therefrom, each of these chains being connected by a collar 61 with the adjacent tree. A number of harrow sections are shown at 62, and by aid of couplings 63 are connected with the trees 56, 57.

The draft beam 32ª differs from the draft beam 32 in that these two members are made left and right respectively, and the draft beam 32ª is connected to extending portions 29 of the circle 27, as may be understood from Fig. 3. The parts are so arranged that the draft beams 32, 32ª, are flexible relatively to each other, owing to the fact that the circles 25, 27, 28, are movable relatively to each other.

Whether the device is in action for the purpose of harrowing or evening broken ground, the forward pull of the tractor 8 upon the tongue 10, maintains the supporting bars 16 in planes parallel with a plane passing vertically through the tongue. This insures a pre-determined position for the circle 25. The other circles 27, 28, being loose relatively to the circle 25, and having such slight freedom of movement as is permitted by the flexibility of various braces and analogous parts, serve to prevent the device from being subjected to undue rigidity. Nevertheless the draft beams 32, 32ª, are always maintained in substantial alinement where the ground operated upon is level. By adjusting the tension of the cable 48, serving as a brace, more or less play is allowed for the draft beams 32, 32ª, relatively to each other; that is, play in a substantial horizontal plane, as permitted by relative movements between the circles 25, 27 and 28.

As the machine proceeds along over the ground the harrow sections 62 can make slight movements relatively to each other, so as to conform to the general contour of the ground. The trees 56 have a little less freedom of movement than do the harrow sections, and the draft beams 32, 32ª, because of their length and rigidity, have still less movement relatively to each other. Nevertheless from the tractor back to the rear of the harrow sections there is considerable flexibility, the net result being that while the harrow sections are maintained in proximate alinement at any particular point, they may, in the aggregate, adapt themselves to levels which vary considerably, and yet each portion of ground over which the harrow sections passed is operated upon quite thoroughly.

In order to enable the device to be used after the manner of a vehicle, so as to facilitate the transportation of the various parts along a road, I provide a few additional parts as may be understood from Fig. 5. For the purpose here indicated the various harrow sections and parts immediately associated with them are removed, and the draft beams 32, 32ª, and parts carried thereby are moved into the positions indicated in Fig. 5. Fastenings 64 are provided for the purpose of supporting the brace rods 52, which are bent back parallel with the respective draft bars. A brace 65 is extended across from one draft bar to the other, and secured in position by aid of tie plates 66, a pair of metallic rods 67 is crossed as indicated in Fig. 6 and used for bracing the draft beams and parts carried thereby. A number of cross beams 68, 69, 70, are provided and are secured to the draft beams. These cross beams serve to some extent as a skeleton floor or platform, and are used for supporting the harrow sections and various other parts. An axle 71 is extended across the machine and upon this axle rests the weight of the draft beams and parts supported thereupon. The carrying wheels 37 are mounted upon the ends of this axle instead of upon gudgeons 34ª at the outer ends of the draft beams. It will be understood that the draft beams can readily be swung around, so as to form a substantially V-shaped member, as indicated in Fig. 5, because the circles 25, 27 and 28, are movable relatively to each other as above described. When once moved into the position indicated, as shown in Fig. 5 and properly braced, the draft beams together with other parts constitute an efficient vehicle body. With the parts in this condition, the device may be treated practically as a vehicle, and drawn along the road by the tractor in substantially the same manner as any other large vehicle. In some instances, instead of the circles 25, 27, 28, above mentioned, and parts immediately associated therewith, I employ the mechanism shown in Fig. 7. The carrying wheel 24 is here provided with hub 72, and extending through this hub is a gudgeon spindle 73, provided with a flat body portion 74, the latter being bolted rigidly to the draft beam 32. The gudgeon spindle is provided with a reduced neck portion 75, which extends through a hole in a bearing plate 76. This bearing plate is provided with a portion 77, which is sunken into the draft beam 32ª, and secured to the same by bolts 78. Nuts 79 prevent the bearing plate 76 from leaving the neck portion 75 of the gudgeon spindle. The draft beams 32, 32ª thus have a slight movement relatively to each other. Except as here indicated the rest of the mechanism is as above described with reference to Figs. 1 to 6 inclusive.

I do not limit myself to the precise details of construction here shown and described. Manifestly the various mechanical parts may be made in different ways without departing from the spirit of my invention which is commensurate with my claims.

Having thus described my invention what I claim as new and desire to secure by Letters Patent is as follows:

1. A device of the character described, comprising a carrying wheel for engaging the ground, a stub shaft extending through said carrying wheel, bearings engaging said stub shaft, supporting bars connected with said bearings, a circle bearing, means for connecting said circle bearing rigidly to said supporting bars, a pair of draft beams, a circle bearing carried by each of said draft beams and engaging said first mentioned circle bearing, harrow mechanism connected to said draft beams, and a tongue connected to said supporting bars for the purpose of dragging the device over ground.

2. A device of the character described, comprising a frame, a wheel mounted in the frame, a pair of draft beams pivoted to the frame to stand in alinement or at an angle to the line of draft, and means for holding the draft beams in position.

3. A device of the character described comprising a tongue, a wheel supported bearing circle, connections from said tongue to said bearing circle, a pair of draft beams, a circle bearing connected with each of said draft beams and mounted loosely upon said first mentioned circle bearing and externally concentric to the same, so that said draft beams may be moved upon said first mentioned circle bearing as a center and braces connecting the tongue with the draft beams.

4. A device of the character described, comprising a frame provided with a tongue, a wheel mounted in the frame, oppositely arranged draft beams carried by the frame, wheels on the outer ends of the draft beams, braces connecting the tongue with the draft beams, harrow sections, and flexible connections between the harrow sections and the draft beams.

5. A device of the character described comprising a carrying wheel provided with a hub, a stub shaft extending through said hub, bearings of substantially U-form disposed upon opposite sides of said hub and engaging said stub shaft, brace bars connected with said bearings, a circle bearing secured rigidly to said brace bars, braces connected with said circle bearing, supporting bars secured to said braces, a tongue, connections from said tongue to said supporting bars, a pair of draft beams, a circle bearing carried by each of said draft beams and loosely engaging said first mentioned circle bearing, so as to allow said draft beams to move relatively to said first mentioned circle bearing, means for bracing said draft beams in order to limit relative movements thereof, and harrow mechanism connected with said draft beams for the purpose of operating upon the earth.

6. In a harrow evener, the combination of a tongue, a pair of hounds secured to said tongue, a pair of supporting bars pivotally connected to said hounds, a circle bearing connected to said supporting bars, a pair of other circle bearings engaging said first mentioned circle bearing externally and movable relatively to each other, a pair of draft beams each connected with one of said second mentioned circle bearings, a carrying wheel for engaging the ground and supporting said supporting bars and said draft beams, other carrying wheels for supporting said draft beams, and harrow mechanism connected with said draft beams and actuated by movements thereof.

7. In a harrow evener, the combination of a pair of draft beams, mechanism connected with said draft beams for enabling the same to move slightly in relation to each other, carrying wheels for supporting said draft beams, chains connected with said draft beams and extending therefrom at right angles, trees connected with said chains, some of said trees being longer than others, connections between adjacent pairs of the short trees, and chains connected with said draft beams and extending therefrom obliquely into engagement with the shorter of said trees.

8. In a harrow, a frame, a wheel mounted in the frame, pivotally mounted draft beams carried by the frame, said beams being adapted to stand in alinement or to form a V-shaped member, and means for mounting wheels on said draft beams for supporting them in either of the said positions.

9. In a harrow, a frame, a tongue projecting from the frame, draft beams pivoted to the frame, braces connecting the draft beams with the tongue, a plurality of harrow sections, and means for flexibly connecting the harrow sections to the draft beams.

10. In a harrow, a frame, a tongue carried by the frame, draft beams pivoted to the frame, braces hinged to the tongue and draft beams, cables passing through eyes on the tongue and having their ends secured to the draft beams, and harrow sections flexibly connected with the draft beams.

In testimony whereof I have signed my name to this specification in the presence of two subscribing witnesses.

WILLIAM H. JONES.

Witnesses:
   STANLEY L. ELLIOTT,
   LUCIAN M. CULVER.